United States Patent [19]
Hulst

[11] 3,750,178
[45] July 31, 1973

[54] RADIO LOCATION DETECTION SYSTEM
[75] Inventor: George D. Hulst, Verona, N.J.
[73] Assignee: International Telephone and Telegraph Corporation, Nutley, N.J.
[22] Filed: May 22, 1959
[21] Appl. No.: 815,744

[52] U.S. Cl............... 343/112 R, 328/189, 343/103
[51] Int. Cl............................................... G01s 5/06
[58] Field of Search.................... 340/206; 328/189; 343/112, 12, 103, 17.1; 250/17.54 D; 228/189

[56] References Cited
UNITED STATES PATENTS
2,433,379  12/1947  Levy et al..................... 250/20.54 D
2,637,841   5/1953  Davis et al.......................... 343/112
2,864,081  12/1958  Steelman............................ 343/112

Primary Examiner—Benjamin A. Borchelt
Assistant Examiner—Richard E. Berger
Attorney—Percy P. Lantzy

EXEMPLARY CLAIM

1. In a radio location detection system for locating the geographical position of a source of discrete radio frequency signals having a plurality of spaced radio receiving stations at known geographical locations; the combination of a timing means at each said receiving station in time synchronism with the timing means of said other stations, means to receive said discrete radio frequency signals, means to detect from each said discrete received signal the envelope of said signal, means to invert and delay said detected envelope, means to combine said inverted and detected envelope of given amplitude with said detected envelope at a different amplitude to produce a first combined signal having a positive portion and a negative portion with a crossover point at the zero axis occurring a predetermined time after the arrival at said receiver of said discrete radio signal, means to derive from said detected envelope a gating pulse and means to combine said gating pulse with said first combined signal to produce a second combined signal containing all of said negative portion and part of said positive portion of said first combined signal and including said zero crossover point, means to derive from said second combined signal a marker pulse coincident with the time of said zero crossover point, means to determine with reference to said timing means the time of occurrence of said marker pulse signal, means to compare the times of occurrence of corresponding marker pulses at said receivers to derive the time differences therebetween, said time differences indicating at least two hyperbolic lines, the intersection of which provides the geographical position of said source of radio frequency signal.

12 Claims, 6 Drawing Figures

INVENTOR.
GEORGE D. HULST
BY [signature]
ATTORNEY

INVENTOR.
GEORGE D. HULST
BY
ATTORNEY

RADIO LOCATION DETECTION SYSTEM

This invention relates to radio location detection systems and more particularly to a new system for locating a source of signals by means of a plurality of spaced detection points and by comparing the relative time of signal arrival at such points.

A time difference system of position finding is based on the finite propagation velocity of electromagnetic waves in which the direction of arrival of information-bearing signals is determined from a measurement of time delay between the signals at different locations. Several such measurements may be made at separated locations to obtain a position fix. It differs from a hyperbolic navigation system such as Loran in that it uses a plurality of receivers at known locations to locate the position of a transmitter, whereas the Loran employs one receiver to locate one's own position with respect to a plurality of transmitters at known locations. In the inverse system for locating the position of a radio transmitter transmitting pulsed or otherwise modulated signals, the arrival times of said signals at spaced receiving stations on the ground are compared. Since more than one receiving station is involved, and since prior knowledge of the transmitted message is usually not known, the arrival times of signals at one receiving station must be communicated in some manner to the other receiving station or to a common comparison point. One of the major problems in a system of this sort is the actual determination of the arrival time of the signals at the various ground station receivers. For pulse-type signals having very steep leading edges and in the absence of noise this determination may be made with comparative ease. In a practical situation, however, selective circuits in the receiver will cause the leading and trailing edges to be gradual and the received signals will be mixed with a considerable amount of noise.

It is an object of this invention, therefore, to provide an improved system of the "Inverse Loran" type for locating a source of radio frequency signals which will consistently detect within acceptable limits the arrival time of discrete radio frequency signals even though considerably distorted by the presence of noise.

It is another object to provide an improved system for determining the time difference in the reception of signals at a plurality of different ground stations even though the signals have high signal-to-noise ratios.

In its broadest sense this invention is a radio location detection system for locating the geographical position of a radio transmitter or other signal source which comprises a plurality of spaced receiving stations at known geographical locations, each receiving station being in time synchronism with the other station. Each receiving station has means to receive discrete radio frequency signals radiated by the transmitter and means to derive from each of the received discrete signals a marker pulse which consistently represents the time of arrival of a discrete signal within exceptionally close limits at said receiver. The system has means to compare the time in the arrival of a given discrete radio signal at each of the receivers to derive at least two time differences indicating two hyperbolic lines, the intersection of which provides the geographical position of the transmitter.

A feature is the means to detect the envelope of the received signal and to invert and delay the inverted envelope for use in consistent time detection of signal arrival. The delayed inverted envelope of one amplification is combined with the original detected envelope at a different amplification to produce a combined signal which has negative and positive portions and a crossover point at the zero axis a predetermined time within close limits after the arrival of said radio frequency signal. This crossover point is used to develop a pulse for the precise measurement of the incoming signal for it is the actual arrival time of the signal plus a constant delay time incorporated in the receiver.

The above and other objects and features of this invention will become more apparent by reference to the following description taken in conjunction with the accompanying drawings, in which.

Figure 1:
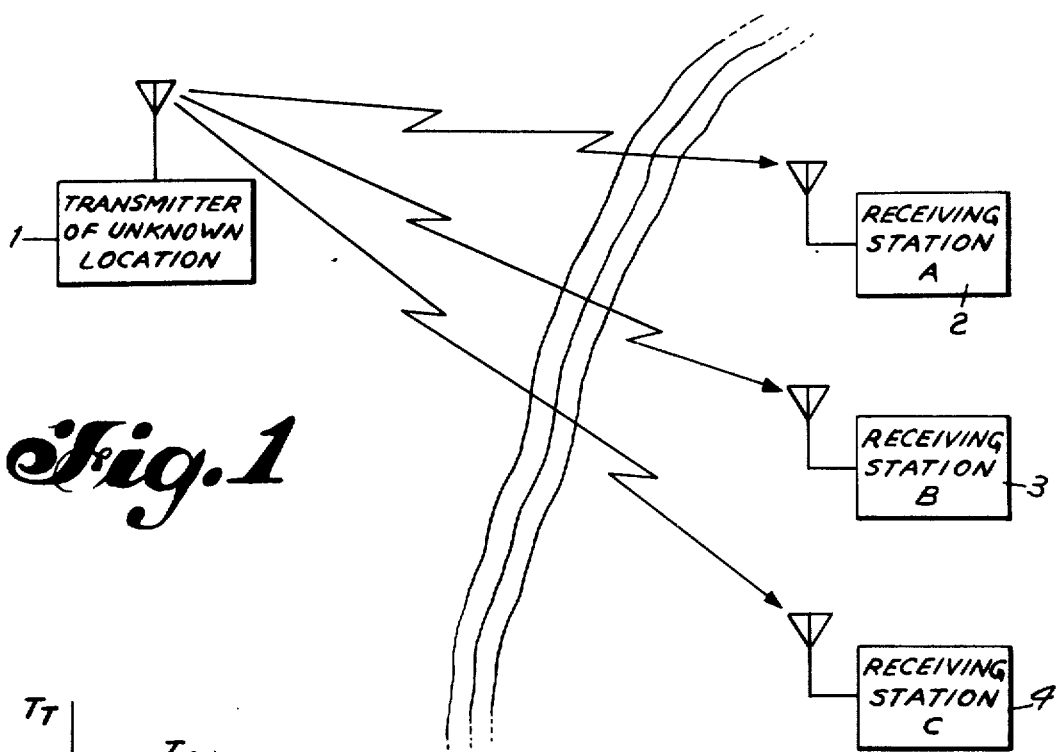
FIG. 1 is a plane diagram of a radio location system such as the system of this invention.
Figure 2:
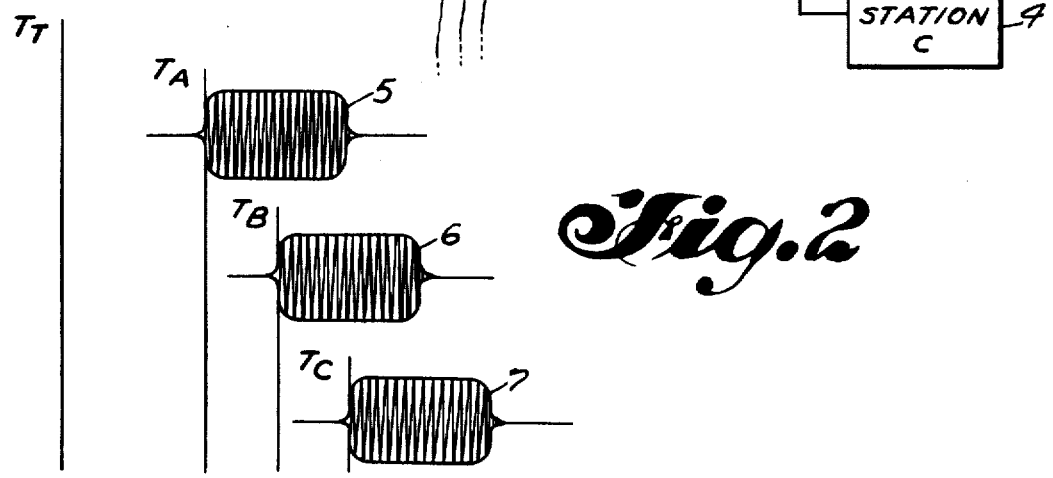
FIG. 2 is a graph illustrating different times of arrival of transmitted signals at each of the ground stations.
Figure 6:
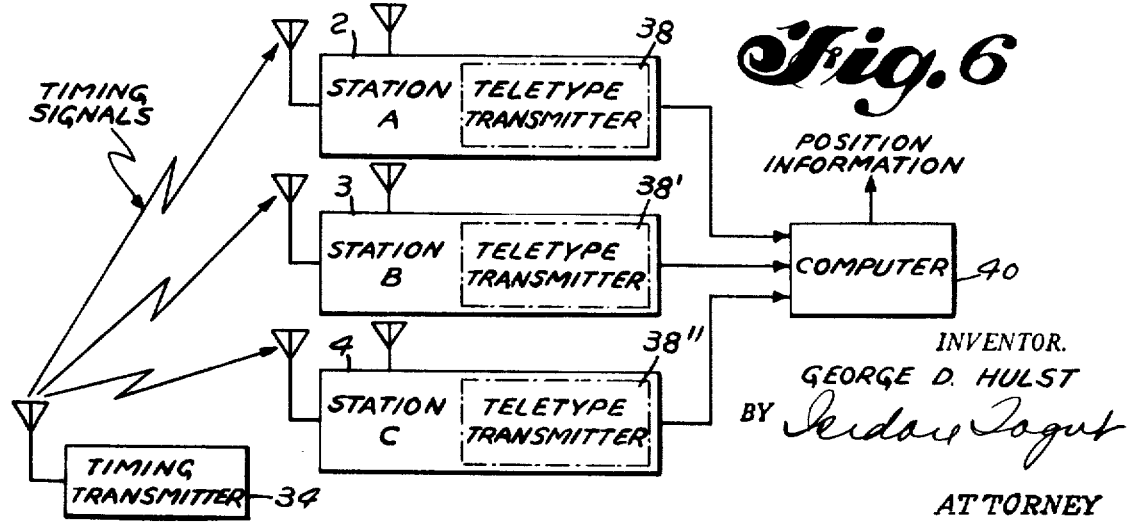
FIG. 6 is a block diagram of the consolidated stations, timing transmitter, teletype transmitter and computer.

Referring now to FIG. 1, there is shown a transmitter 1 of unknown location transmitting radio frequency signals received by stations A, B and C located respectively at known locations 2, 3 and 4. These stations have means whereby to synchronize local timing devices or clocks at these stations. FIG. 2 SHOWS the envelope of signals containing the radio frequency carrier as transmitted by the unknown transmitter. The envelope 5 is received at station A at a time $T_a$, the envelope 6 is received at station B at a time $T_b$ and the envelope 7 at station C at a time $T_c$. The problem then is to determine the time difference in the arrival of signals 5, 6, and 7 at the various stations, in order to derive the necessary information to determine the position fix of the unknown transmitter.

Figure 3:
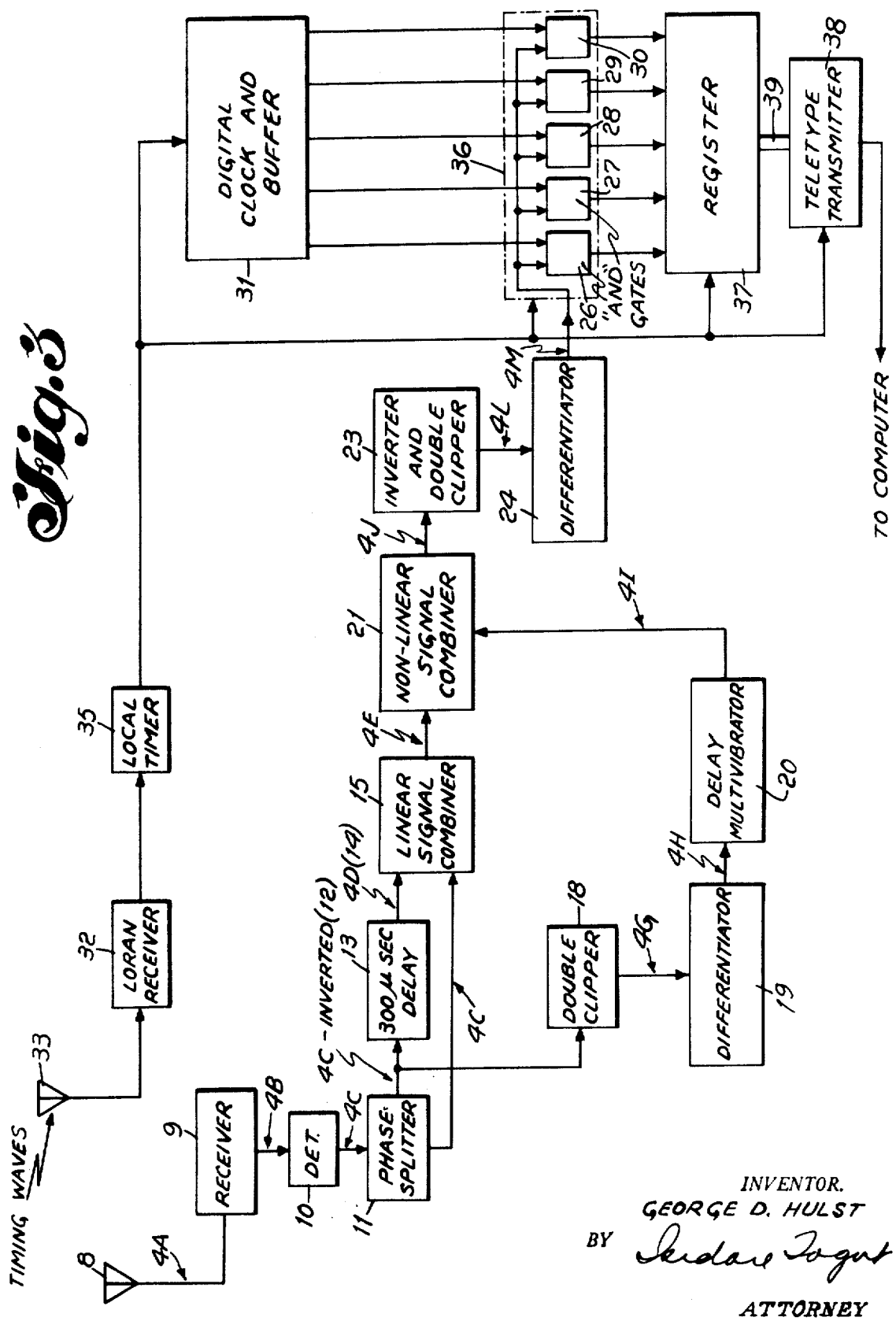
FIG. 3 is a block diagram of the components of the circuit required at each receiving station.
Figure 4:
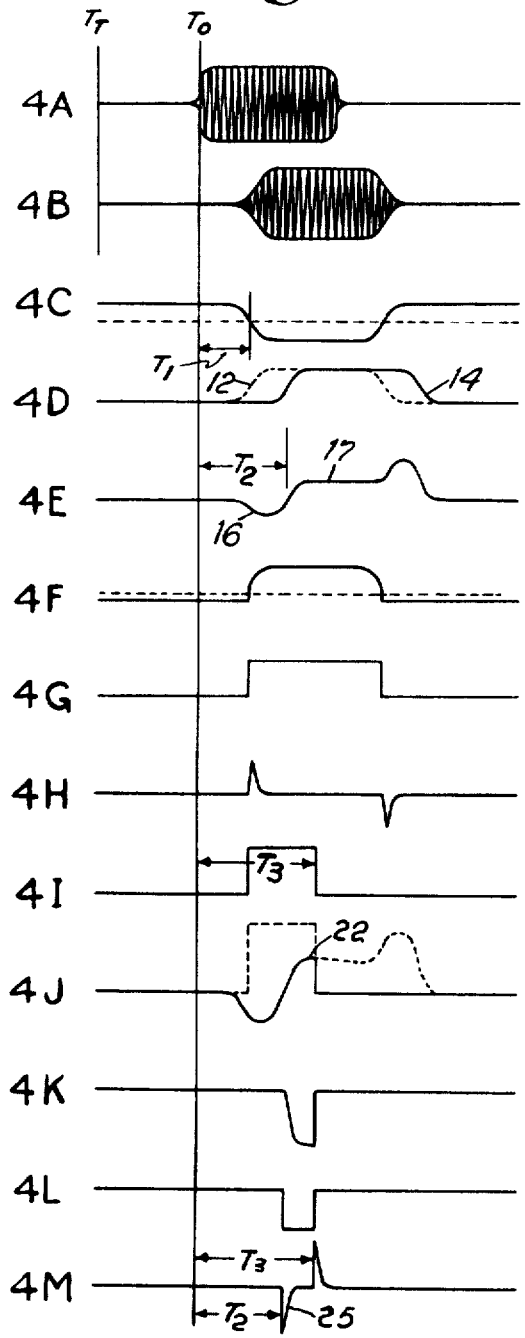
FIG. 4 is a graph of the waveforms used in explaining the operation of this invention.
Figure 5:
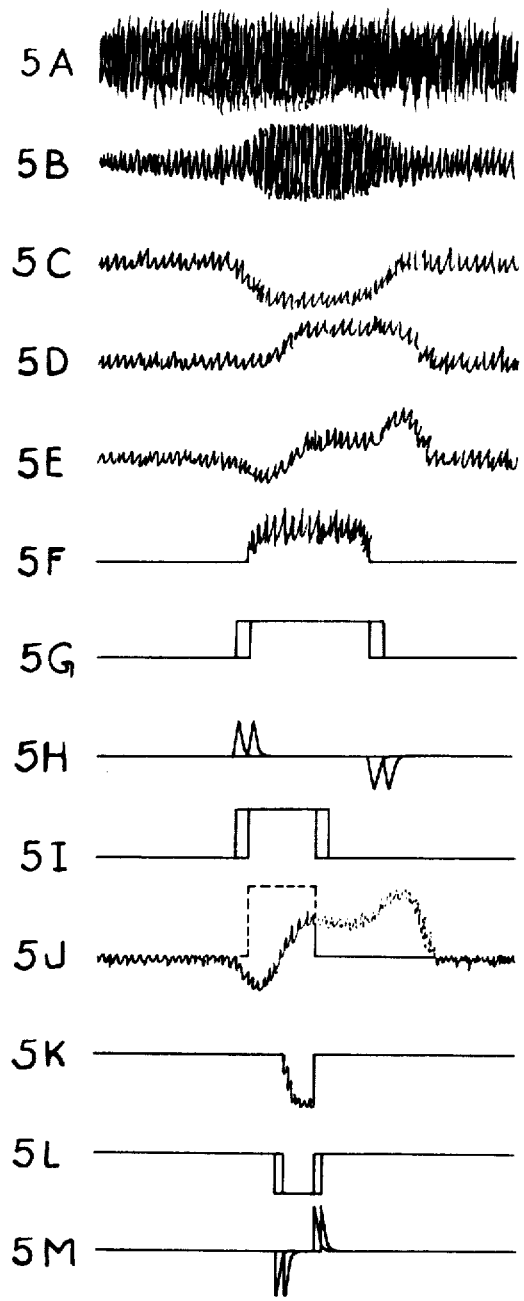
FIG. 5 is a graph of similar waveforms with noise superimposed thereon.

With reference to FIGS. 3, 4, and 5, there is shown more particularly the elements utilized in the technique of delayed signal reversal of this invention. The transmitted signal is received at the antenna 8 and is detected in the receiver 9 which is a selective receiver with a finite bandwidth. Waveform 4A shows the form of the received signal at the antenna 8 received at a time $T_0$. Waveform 4B is the same signal after it has passed through the receiver 9, its envelope being delayed and the leading and trailing edges of the signal being lengthened by the selective circuits of the receiver. Waveform 4A shows a pulse signal having time discontinuities. The basic form of such a wave is shown as a Morse dot plotted against a time abscissa. However, any pulse signal may be received and utilized in this invention or any signal having modulation thereon, such as on-off type pulses and frequency shift keyed signals. The demodulated signal after passing through the detector 10 is shown in waveform 4C. This wave passes through a phase splitter 11 which has two outputs, one the original detected envelope 4C and the other one the inverted detected envelope shown as the dotted waveform 12 in 4D. The inverted envelope 12 is then passed through a delay circuit 13 which then produces the waveform 14 of 4D. The original detected envelope 4C and the inverted delayed envelope 14 are then combined in a linear signal combiner 15 to produce the combined wave 4E. The linear signal combiner 15 adds the original detected envelope 4C, reduced in amplitude by approximately one-half, and the inverted delayed envelope 14 at full amplitude to form the combined envelope 4E. Waveform 4E has a negative portion 16 and a positive portion 17. The elements of the phase splitter 11, the delay 13 and the combining network 15 are all passive and stable so that the relative amplitude of the two components of the signal 4E will not change. It should be noted that the wave 4E first goes negative in the portion 16 and becomes the positive portion 17 crossing the zero axis at a time $T_2$ after the arrival time of the pulse 4A. The components of the circuitry are expressly selected so that this crossing point at $T_2$ is the point of maximum slope of the incoming wave, delayed through the selective circuit of the receiver. This crossing point at $T_2$ is the best time to measure the arrival time of the pulse because the ratio of signal change to noise will be maximum. The least error in timing will therefore occur from the noise that is present. Another important feature is that the time of the zero crossing is independent of signal amplitude over a wide range. This avoids the necessity for a precise amplitude control of signal. It also permits accurate time measurements to be made. The received detected inverted envelope 12 is also fed into a double clipper 18 with an adjustable clipping level. The time at which clipping occurs lags the arrival time by the interval $T_1$ which depends to some degree upon the size of the received signal and the amount of the noise present. The doubly clipped wave, the output of double clipper 18, 4G is differentiated in the differentiator 19 to form the wave 4H. The wave 4H is fed into a delay multivibrator 20 to produce a gating pulse 4I which begins at $T_1$ and leasts up to the time $T_3$. Since under conditions of noise many zero crossings of the signal 4E occur, the need for a gate becomes apparent to prevent false readings.

The operation of the gate is as follows. The recombined signal wave 4E is added to the gate wave 4I in the non-linear signal combiner 21 so that the resultant wave output thereof 4J is at all times the more negative wave of the two component waves. The position portion of this wave begins at time $T_2$ which is the zero crossover point and ends at $T_3$. This positive portion 22 is inverted and clipped in the inverter and clipper 23 to form the wave shape 4K and further reclipped to form the square pulse 4L. The pulse 4L is differentiated in the differentiator 24 to form the waveshape 4M which has a negative pip 25 at time $T_2$ and the positive pip at time $T_3$. The negative pip of this differentiated wave is used for the precise measurement of the incoming signal. It is the actual arrival time of the signal at $T_O$ plus a constant delay time $T_2$. This delay time $T_2$ is adjusted to be the same in all receivers, A, B, and C. The negative pip portion of the differentiated signal 4M is then fed into AND gates 26, 27, 28, 29, and 30 to which is also coupled the output of the digital clock and buffer 31. This digital clock 31 is synchronized with similar digital clocks in the other receiving stations by means of a Loran receiver 32 which is coupled to the output of a receiving antenna 33 to receive timing wave signals from a Loran transmitter 34. The detected signals are fed to a local timer 35 which in turn synchronizes the operation of the digital clock and buffer 31, the clock reader 36 which comprises the AND gates 26, 27, 28, 29 and 30, the data reduction unit or register 37 and the teletype transmitter 38. In an embodiment of this invention reduced to practice, the digital clocks 31 start a sequence at the same time and run for a period of approximately 700 milliseconds when they are then reset for the same sequence. At any instant of time, when the negative pulse output of the differentiator 24 enters any of the AND gates and an output of the clock 31 occurs at any one of the AND gates, there will be an output from that particular gate which is fed into the register 37. Such a register comprises a set of flip flops of the type described in "Digital Computer Components and Circuits" by R. K. Richards, pulished in 1957 by D. Van Nostrand Company, Inc. on Page 71. The output of the clock is, of course, binary numbers in sequence. The output of the AND gate wherein there occurs a coincidence of the clock signal and the negative pulse signal 25 is also a binary number which is fed into the register 37 where the pulse 25 occurrence times are accumulated and added and averaged. This averaged pulse time occurrence is recored in digital form on punched tape 39. The time recorded in digital form on the punch tape 39 is transmitted via the teletype transmitters 38, 38' and 38'' to a computer 40 such as the LPG-30 manufactured by the Royal McBee Corporation, Port Chester, N.Y., which is located at one of the receiving stations or other suitable location. This computer will utilize the binary information transmitted by each of the stations and determine therefrom by a process of simple subtraction and division the time difference in the arrival of the signals at the stations A, B and C. The information transmitted by any one of the stations is a pure number which is determined by the coincidence of the negative pulse signal 25 and the clock output indicative of that number at any one of the AND gates. This, of course, represents that a pulse signal 25 was formed at a certain time after the clock 31 started running. However, the information from the clocks and the AND gates of the other receivers are in similar digital form, that is, a number for each and the function of the computer on receiving the three numbers is to subtract one from the other which then gives the time difference in milliseconds or microseconds as the case may be in the arrival of a given signal at the different stations. With this information the geographical positon of the transmitting station on the hyperbolic lines can be located according to the well established practices familar to users of Loran navigation charts.

The operation of the system under noise is explained by reference to the waveforms shown in FIG. 5. In waveforms 5A, the received pulse is shown largely masked in random noise. In waveform 5B, the pulse and noise are shown at the passage through the receiver 9 which reduces the noise by the square root of the bandwidth. The amplitude of the signal is not reduced but has been delayed and its rise and fall times have been increased as heretofore explained. In waveform 5C, the detected signal envelope is shown in the presence of associated noise. The signal is reversed and delayed in waveform 5D and combined with a half amplitude of the original detected wave 5C to form the combined wave 5E. Random noise and the two waves combine in resultant noise increased by a factor of 1.12 times. This is an increase of noise of 1 db over that in the original received signal. The gating wave 5I is derived as before but in this case $T_1$ and $T_3$ are subject to the effect of noise which tends to shift both points. As long as the gate wave has been adjusted to bracket the zero crossing of wave 5E under all conditions of noise, the circuit will operate properly. Variations in the timing of the waves under extreme conditions of noise are shown in FIGS. 5I, 5L and 5M where the double waveform represents the expected extreme conditions.

In the embodiment of this system, the receiver has a 3kc bandwidth, $T_1$ is 200 microseconds, $T_2$ is 500 microseconds and $T_3$ is approximately 700 microseconds. $T_1$ and $T_2$ are adjustable. $T_1$ depends upon the threshold level of signal 5C which will operate the gate. It is adjusted so that $T_1$ precedes $T_2$ by a comfortable margin of time. $T_3$ depends upon the duration of the gate pulse 5I and is adjusted to follow $T_2$ under all conditions of signals. It is important to note that the zero crossover point of wave 5E is not affected by amplitude changes nor is it biased by noise.

The operation of this system has been described by means of one received pulse signal or one event. There are statistical advantages in averaging arrival time information from a large number of events to obtain a more definite fix of the position of the transmitter. The data can be recorded on the tape as fast as received and thus will not accumulate within the system before recording. For purposes of illustration, only five AND gates have been shown but it is to be understood that this invention is not limited to this number. If the clock is read while it is changing, a serious reading error could occur. To avoid this, it is necessary to program the clock changes on a precisely controlled schedule. Readout at the occurrence of an event pulse must likewise be programmed precisely at a period of quiesence in the clock.

While I have described above the principles of my invention in connection with specific apparatus, it is to be clearly understood that this description is made only by way of example and not as a limitation to the scope of my invention as set forth in the objects thereof and in the accompanying claims.

I claim:

1. In a radio location detection system for locating the geographical position of a source of discrete radio frequency signals having a plurality of spaced radio receiving stations at known geographical locations; the combination of a timing means at each of said receiving station in time synchronism with the timing means of said other stations, means to receive said discrete radio frequency signals, means to detect from each said discrete received signal the envelope of said signal, means to invert and delay said detected envelope means to combine said inverted and detected envelope of given amplitude with said detected envelope at a different amplitude to produce a first combined signal having a positive portion and a negative portion with a crossover point at the zero axis occurring a predetermined time after the arrival at said receiver of said discrete radio signal, means to derive from said detected envelope a gating pulse and means to combine said gating pulse with said first combined signal to produce a second combined signal containing all of said negative portion and part of said negative portion of said first combined signal and including said zero crossover point, means to derive from said second combined signal a marker pulse coincident with the time of said zero crossover point, means to determine with reference to said timing means the time of occurrence of said marker pulse signal, means to compare the times of occurrence of corresponding marker pulses at said receivers to derive the time difference therebetween, said time differences indicating at least two hyperbolic lines, the intersection of which provides the geographical position of said source of radio frequency signal.

2. In a radio locating detection system for locating the geographical position of a source of discrete radio signals having a plurality of spaced radio receiving stations at known geopraphical locations; the combination of a timing means at each said receiving station in time synchronism with the timing means of said other stations, means to receive said discrete radio frequency signals, means to detect from each said discrete received signal the envelope of said signal, means to invert and delay said detected envelope, means to combine said inverted and detected envelope of given amplitude with said detected envelope at a different amplitude to produce a first combined signal having a positive portion and a negative portion with a crossover point at the zero axis occurring a predetermined time after the arrival of said discrete radio signals, means to derive from said detected envelope a gating pulse, means to combine said gating pulse with said first combined signal to produce a second combined signal containing all of said negative portion and a part of said positive portion and including said zero crossover point, means to pass only said positive portion including said zero crossover point, means to invert and clip said positive portion to form a square wave, means to differentiate said square wave to form negative and positive pulse signals, said negative pulse occurring at the time of said zero crossover point, means to determine with reference to said timing means the time of the occurrence of said negative pulse signal, means to compare the times of occurrence of corresponding negative pulses at said receivers to derive the time differences therebetween, said time differences indicating at least two hyperbolic lines, the intersection of which provides the geographical position of said source of radio frequency signals.

3. A radio location detection system according to claim 2 wherein said means to determine the time of occurrence of said negative pulse signal comprises a digital clock controlled by said timing means and producing a pulse output, a plurality of AND gates, means coupling the said clock pulse output and said negative pulse to each of said AND gates whereby the coincidence of occurrence of said clock pulse and said negative pulse at any of said AND gates will cause a digital output from said AND gate indicative of the time of occurrence of said negative pulse and means to store said digital output from said AND gate.

4. A radio location detection system according to claim 3 wherein said comparing means include a computer, means to transmit said digital information from each of said station indicative of said time of occurrence of said negative pulse at each said station to said computer whereby said computer subtracts said occurrence times to derive the time differences therebetween, said time differences being indicative of the time differences in the arrival of said discrete signal at each said receiving station.

5. In a radio location direction system for locating the geographical position of a source of discrete radio frequency signals having a plurality of spaced receiving stations at known geographical locations; the combination of a timing means at each said receiving station in time synchronism with the timing means of said other stations, means to receive said discrete radio frequency signals, means to detect from each said discrete received signal the envelope of said signal, means to invert and delay said detected envelope, means to combine said inverted and detected envelope of full amplitude with said detected envelope of half amplitude to produce a combined signal having a positive portion and a negative portion with a crossover point at the zero axis occuring a predetermined time after the arrival at said receiver of said discrete radio signal, means to derive from said combined signal a marker pulse coincident with the time of said zero crossover point, a digital clock controlled by said timing means and producing a pulse output, a plurality of AND gates, means coupling said clock pulse output and said marker pulse to each of said published gates whereby the coincidence of occurrence of said clock pulse and said negative pulse at any of said AND gates will cause a digital output from said AND gate indicative of the time of occurrence of said marker pulse, a register, means to couple said outputs of said AND gates to said register for adding the times of occurrence of said marker pulses derived from said discrete radio frequency signals during a predetermined time period and deriving from said added occurrence times the average time of occurrence of said marker pulses, a computer, means coupling the output of said register at each said receiving station to said computer whereby said computer subtracts said averaged occurrence times to derive the time difference therebetween, said time differences being indicative of the time differences in the arrival of said radio frequency signals at each said receiving station, said time differences indicating at least two hyperbolic lines, the intersection of which provides the geographical position of said source of radio frequency signals.

6. A system for deriving a timemarker pulse from a received discrete radio frequency signal at a predetermined time after the arrival of said signal comprising means to receive said signal, means to detect the envelope of said discrete signal, means to invert and delay said detected envelope, means to combine said inverted and delayed envelope of given amplitude and said detected envelope at a different amplitude to produce a first combined signal having a negative portion and a positive portion with a crossover point at the zero axis occurring a predetermined time after arrival of said discrete radio signal, and means to develop therefrom a marker pulse occurring at the time of said zero crossover point thus marking a predetermined time interval after the arrival of said discrete radio frequency signal.

7. A system for deriving a marker pulse according to claim 6 wherein said means to derive said marker pulse from said first combined signal comprise means to derive from said detected envelope a gating pulse, means to combine said gating pulse with said first combined signal to produce a second combined signal containing said negative portion and a part of said positive portion and including said zero crossover point, means to pass only said positive portion including said zero crossover point, means to invert and clip said positive portion to form a square wave, means to differentiate said square wave to form negative and positive pulse signals, said negative pulse occurring at said zero crossover point and constituting said marker pulse.

8. In a radio location detection system for locating the geographical position of a source of discrete radio frequency signals having a plurality of spaced radio receiving stations at known geographical locations, the combination of a timing means at each of said receiving stations in time synchronism with the timing means of said other stations, means to derive a marker pulse from each said discrete signal, a digital clock controlled by said timing means and producing a pulse output, a plurality of AND gates, means coupling said clock pulse output and said marker pulse to each of said AND gates whereby the coincidence of said clock pulse and said marker pulse at any of said AND gates will cause a digital ouptut from said AND gate indicative of the time of occurrence of said marker pulse and means to compare the times of occurrence of corresponding marker pulses of said receivers to derive the time difference therebetween, said time differences indicating at least two hyperbolic lines, the intersection of which provides the geographical position of said source of radio frequency signals.

9. In a radio location system according to claim 8 wherein said comparing means include a include means to transmit said digital information from each said station indicative of the time of occurrence of said marker pulse at each said station to said computer whereby said computer subtracts said occurence times to derive the time difference therebetween, said time differences being indicative of the time differences in the arrival of said discrete signal at each said receiving station.

10. In a radio location detecting system for locating the geographical position of a source of discrete radio frequency signals having a plurality of spaced radio receiving stations at known geographical locations; the combination of a timing means at each said receiving station in time synchronism with the timing means of said other stations, means to derive at each receiving station a marker pulse from each said discrete signal, said means to derive said marker pulse comprising means to detect the envelope of said discrete radio frequency signal, means to amplify, invert and delay said detected envelope, and means to combine said inverted and delayed envelope of given amplitude and said detected envelope at a different amplitude to produce a combined signal having a negative portion and a positive portion with a crossover point at the zero axis, said zero crossover point determining the timing of said marker pulse, means to determine with reference to said timing means the time occurrence of said marker pulse, means to compare the times of occurrence of corresponding marker pulses of said receivers to derive the time difference therebetween, said time differences indicating at least two hyperbolic lines, the intersection of which provides the geographical position of said source of radio frequency signals.

11. In a radio location detection system for locating the geographical position of a source of discrete radio frequency signals having a plurality of spaced radio receiving stations at known geographical locations; the combination of a timing means at each said receiving station in time synchronism with the timing means of said other station, means to receive said discrete radio frequency signals, means to detect from each said discrete received signal the envelope of said signal, means to invert and delay said detected envelope, means to combine said inverted and detected envelope of given amplitude with said detected envelope at a different amplitude to produce a first combined signal having a positive portion and a negative portion with a crossover point at the zero axis occurring a predetermined time after the arrival at said receiver of said discrete radio signal, the amplitude of said inverted and delayed envelope being greater than the amplitude of said detected envelope, means to derive from said detected envelope a gating pulse and means to combine said gating pulse with said first combined signal to produce a second combined signal containing all of said negative portion and part of said positive portion of said first combined signal and including said zero crossover point, means to derive from said second combined signal a marker pulse coincident with the time of said zero crossover point, means to determine with reference to said timing means the time of occurrence of said marker pulse signal, means to compare the times of occurrence of corresponding marker pulses at said receivers to derive the time differences therebetween, said time differences indicating at least two hyperbolic lines, the intersection of which provides the geographical position of said source of radio frequency signal.

12. In a radio location detection system according to claim 11 wherein the ratio of the amplitude of said inverted and delayed envelope to the amplitude of said detected envelope is substantially tow-to-one. one.

* * * * *